United States Patent [19]

Jovic

[11] 3,801,749

[45] Apr. 2, 1974

[54] CROSSPOINT SWITCHING MATRIX INCORPORATING SOLID STATE THYRISTOR CROSSPOINTS

[76] Inventor: Nikola Ljotic Jovic, 5020 N. Bernard, Chicago, Ill. 60625

[22] Filed: June 20, 1972

[21] Appl. No.: 264,567

[52] U.S. Cl. .......................... 179/18 GF, 340/166 R

[51] Int. Cl. ............................................ H04q 3/50

[58] Field of Search............. 340/166 R; 179/18 GF

[56] References Cited

UNITED STATES PATENTS

| | | | |
|---|---|---|---|
| 3,546,394 | 12/1970 | Platt | 179/18 GF |
| 3,694,812 | 9/1972 | Enomoto | 179/18 GF |
| 3,204,044 | 8/1965 | Porter | 179/18 GF |
| 3,550,088 | 12/1970 | Jones | 179/18 GF |

*Primary Examiner*—Thomas W. Brown
*Attorney, Agent, or Firm*—James B. Raden; Marvin M. Chaban

[57] ABSTRACT

Disclosed is a crosspoint matrix applicable for use in telecommunications switching networks. Each crosspoint includes a silicon controlled rectifier or semiconductor thyristor plus a suitable gating member. A marking signal of voltage higher than a reference voltage suitably marks a selected conductor of one multiple. A voltage more negative than that of a second reference of the other multiple suitably biases a conductor of the other multiple. Concurrently therewith, a triggering signal is transmitted to the gate of the biased crosspoint completing a path across the matrix. The threshold or reference voltage levels used are considerably separated from the voltage level band used in passing information across a triggered crosspoint, thus resulting in no interference between crosspoints.

10 Claims, 4 Drawing Figures

CROSSPOINT SWITCHING MATRIX INCORPORATING SOLID STATE THYRISTOR CROSSPOINTS

RELATED CASE

This application is a companion case to my application filed of even date for Multiple Communications Switching Network.

BACKGROUND OF THE INVENTION

Crosspoint or matrix switching networks as applied to telecommunication networks have evolved from the early crossbar switches matrices to the use of reed switches and of many forms of solid state devices. Many of these solid state crosspoint matrices respond to marking of the respective ends of the network to automatically complete a path between the marked ends. Other systems use external selection mechanisms to select and direct a path through the network.

The crosspoint switch in any of such systems may have components such as diodes, four layer diodes, transistor trigger circuit configurations, gating networks, field effect, transistors, and forms of controlled rectifiers.

In some of these circuits, especially those using three terminal switching members as the major operative crosspoint component, intricate gating networks per crosspoint have been used including flip-flops, gates and the like.

Many systems, as evolved, employ a single switching stage with only one operative crosspoint necessary to complete a path through the system. This approach effectively limits the number of inlets and outlets which can be employed, although admittedly the approach simplifies the switching problems and eliminates blocking problems.

Where, however, a large plurality of inlets, i.e., over 100 are employed, a single stage becomes difficult to produce and control in that the matrix size must reach almost unmanageable proportions. Multiple stages must generally be used, and provisions made to overcome the blocking, fan out and noise problems inherent in such systems.

SUMMARY OF THE INVENTION

The present invention is directed to a matrix for a multiple stage network of the type shown in my U.S. Pat. No. 3,576,950, issued 5/4/71. In that patent, I used two-terminal, PNPN diodes at the matrix crosspoints. With two-terminal crosspoints, the need for matrix control was minimized, however, certain of the crosspoint characteristics were not readily controlled.

The present system uses either a three or four-terminal silicon controlled rectifier (SCR) which may also be called a semi-conductor thyristor, as the crosspoint switching element within matrices. The matrices are designed with control sections such that a multiple stage network will respond to marks on both of its ends to complete a path therethrough responsive solely to the end marking.

At each crosspoint, the anode and cathode of the crosspoint SCR are connected to the respective intersecting H and V conductor multiples. When a four-terminal SCS is used, the cathode gate is connected through a suitable bias resistor to its cathode terminal lead. The anode gate for either three-terminal or four-terminal device is connected to the output of an AND gate individual to the crosspoint to provide a triggering signal for a properly biased crosspoint.

The switching characteristics of the SCR are well known and operate on the premise that two conditions must co-exist in order to fire the crosspoint rectifier. These conditions are (1) that the voltage applied to the anode (VA) is greater than the voltage applied to the cathode (VK) and (2) a control signal is applied to the gate terminal. A crosspoint with these characteristics is essentially not suitable for matrix use.

In order to make the SCR suitable for matrix application, two voltage detectors are introduced: "+" and "−" threshold detectors, set to predetermined threshold levels of +VR and −VR. These detectors provide two separated voltage bands to aid in the control of crosspoint switching. These bands are well-separated from the signalling (or intelligence) band (which is used after the device is turned on). Mathematically, the switching characteristic of the crosspoint is now different from that of and SCR and may be analyzed as follows:

1. VA $\geq$ +VR
2. VK $\leq$ −VR
3. Control Signal Present —all voltages being instantaneous direct current where:

$V_A$ = Voltage applied to the anode
$+V_R$ = +Threshold Detection Voltage
$-V_R$ = −Threshold Detection Voltage
$V_K$ = Voltage applied to the cathode.

The crosspoint turns on when the conditions of equations (1) (2) and (3) are simultaneously met.

In addition, in order to keep the crosspoint switched on, an externally supplied current "IS" has to be greater than "IH" (holding current of the device).

The crosspoint is turned off if either condition stated below is present, i.e.:

4. IS $\leq$ IH, or
5. VA $\leq$ VK.

Where IS = Current supplied by the external circuits, and
IH = Holding current.

It is, therefore, an object of the invention to provide a new and improved switching matrix employing a solid state thyristor as the switching element at each crosspoint.

It is a further object of the invention to provide a switching matrix which provides a discrete separation between the direct current switching voltage levels and the signalling voltage levels through a switched crosspoint.

It is a further object of the invention to provide a new switching matrix which can be incorporated into a multiple stage matrix requiring only end marking for firing of a path through the networks.

It is a further feature of the invention to provide a matrix susceptible of integrated circuit fabrication, and capable of having small integrated circuit matrix units joined to produce matrices having greater numbers of crosspoints.

It is a still further object of the invention to provide a crosspoint which requires three conditions for firing, and which, in various stages of a multiple stage network, may have one or another condition set at the level necessary for firing such that the firing control may be implemented different ways for different stages.

It is a still further object of the invention to provide an electronic crosspoint which, when seized, is immune to firing signals applied to adjacent crosspoints.

These and other objects, features and advantages of the invention will become apparent from the following explanation viewed in conjunction with the drawings described in the following brief description.

DETAILED DESCRIPTION OF THE DRAWINGS

Figures 1, 4:
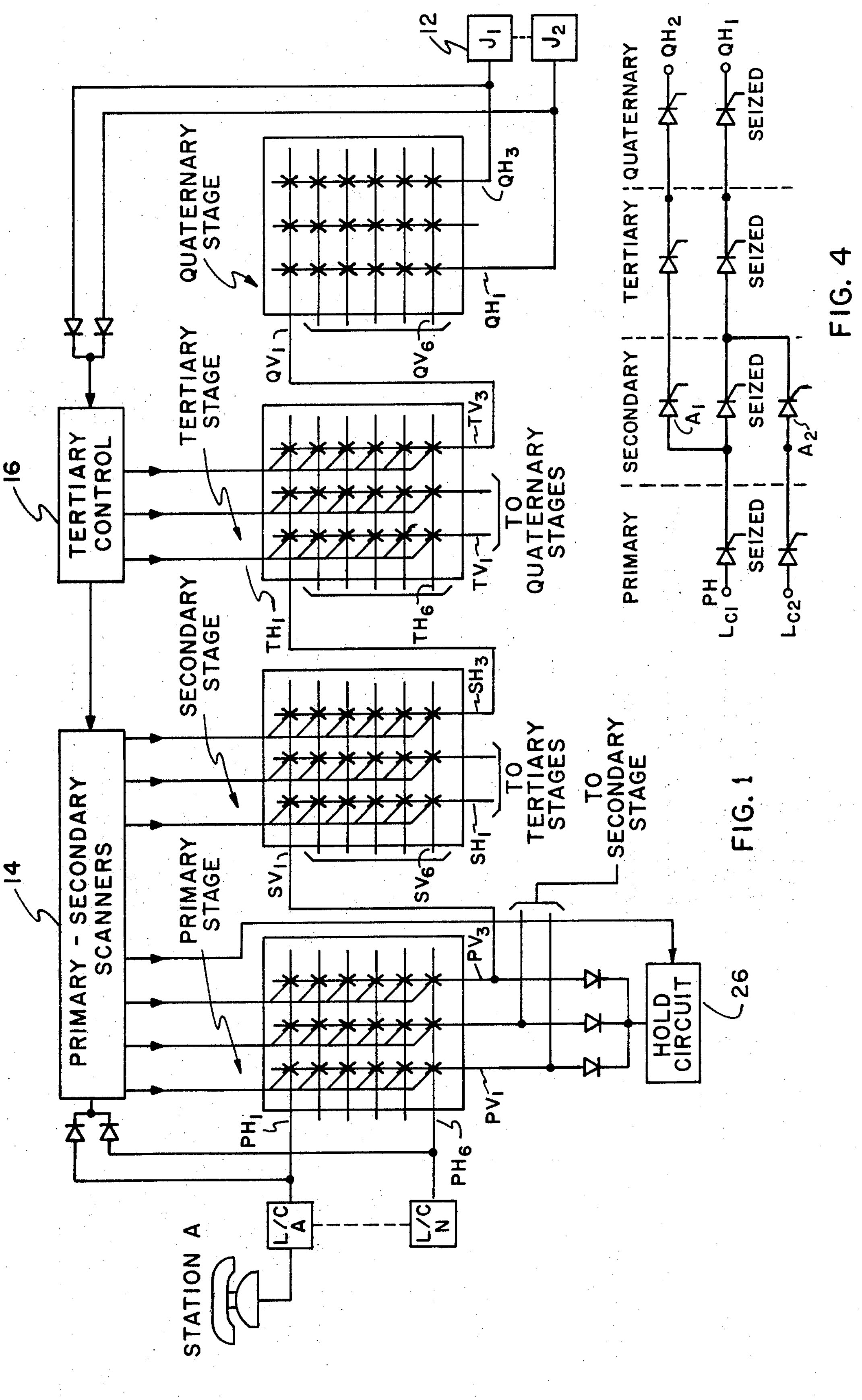
FIG. 1 is a schematic representation of a four stage matrix network employing one form of my invention.
FIG. 4 is a schematic representation of a seized path through the stages of the network illustrating the immunity feature described.

In FIG. 1, I show schematically a four stage switching network generally similar to that shown in my U.S. Pat. No. 3,576,950, issued 5/4/71. For telecommunications use, as shown in that patent, switching is accomplished by direct current biasing of two intersecting conductors in the matrix. There, I used a four-layer diode as the main crosspoint switching element in each of the matrices. In both cases, at least one matrix including intersecting multiples designated H and V is employed per stage. Four stages are used, there being designated primary, secondary, tertiary and quaternary in my reference patent and in the present case. For the primary stage, subscriber line circuits or their equivalent have appearances on the respective H multiple conductors. Junctors, trunks and the like are connected to the respective H multiple conductors of the quaternary stage. The various stages are interconnected by trunking or jumping in any suitable fashion. The internal trunking or grading between stages and external matrix conditioning circuits are shown only exemplarily herein for the purpose of explaining the invention thoroughly.

A path through the network is started in response to a station seeking service by going off-hook as by picking up the handset or its equivalent. If Station 1 goes off-hook, its line circuit L/CA places a mark in the form of a dc signal of voltage($V_A$ greater than $+V_R$) signifying the station seeking service on a PH conductor such as H1 of the primary stage. A second mark of voltage $V_K$ more negative than $-V_R$ is placed on the QH conductor of the quaternary stage corresponding to an idle junctor 12 or trunk. The junctor may have been previously allotted as available for use (as shown in my U.S. Pat. No. 3,621,144, issued 11/16/71), or allotted on demand. In any event, both a line mark signal on a PH conductor of the primary and a junctor mark signal on the QH conductor of the quaternary are initiated. Thus, the matrix network is end-marked and will inherently complete a path through the matrix network in response to the marking of both ends of the network.

A primary and secondary stage scanner 14 responds to the end marking of both ends of the matrix in the form of a mark on an H conductor in both the primary and quaternary stages to scan, find and allot an idle vertical in the primary stage leading to the completion of a path through a crosspoint of the marked H conductor of that stage. The scanner 14 responds to completion of a path through the primary to scan over the PC and SC leads to the crosspoint gates and fire a path to an idle SV conductor in the secondary stage. A control circuit 16 is enabled by the mark on the QH conductor multiple of the quaternary to extend a permanent signal and allot an idle TV conductor in the tertiary stage. In the quaternary stage, each crosspoint has its gate terminal permanently enabled to cause its crosspoints to respond to voltages across its anode and cathode as indicated by marking of the two intersecting multiple conductors. In this way, a path through the four stages is completed responsive to the end marking of the network in a manner shown in greater detail in the application referred to previously. A seized path is held by the circuits applying the end marks in a manner preventing the seized path from being broken into by other attempts at path completion.

Recapping, the scanners (14) periodically scan on demand to find an idle PV conductor and SH conductor and to close a path between the marked H conductors PH and QH. In the embodiment shown, the stages are interconnected as follows: the primary PV conductors are connected directly to secondary SV conductors, and a tertiary TV conductor is connected directly to quaternary QV conductor.

Completion of a path through the primary stage is effected responsive to (1) a mark signal and (2) a scan gate signal enable successive connections to SH conductors in the secondary to complete a path through successive scanned crosspoint of the secondary stage. A multiple conductor marked from the secondary stage finds an idle conductor of the tertiary stage having access to the marked QH conductor. A control 16 enables all crosspoints in the tertiary stage having access to the marked quaternary QH multiple. A crosspoint in the tertiary stage fires between the marked multiples and finally a path can be completed through the quaternary stage to complete the path through the four stage network responsive to the end marking potentials applied initially.

Figure 2:
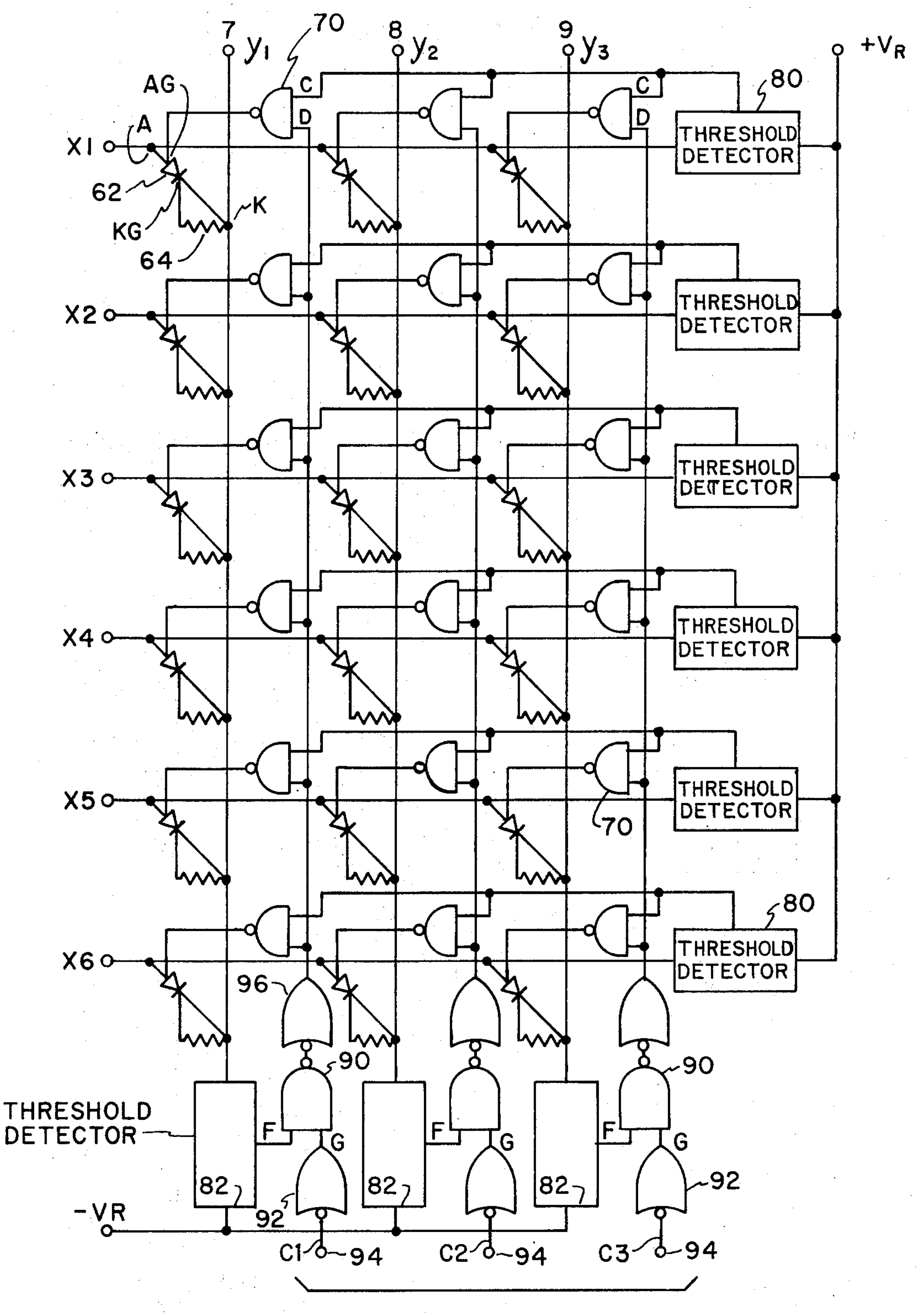
FIG. 2 is a schematic circuit diagram of a crosspoint matrix employing my invention.

In FIG. 2, I show a 6×3 crosspoint matrix unit employing my invention. Matrix units of the configuration of FIG. 2 may be interconnected to provide a 5×5 square matrix, 6×6 square matrix, 10×9 matrix —or other suitable combinations.

The matrix unit of FIG. 2 has six multiple conductors along one axis numbered X1-6 and three multiple conductors numbered Y1-3 along the other axis. Control conductors C1-C3 are connected to the Y multiple conductors, as will be described. Across the intersection of each such multiples is connected a four terminal (or tetrode) commonly known as a silicon controlled switch 62. A three-terminal solid state thyristor or SCR may also be employed as the crosspoint switching element, although it may be somewhat less sensitive than the crosspoint element shown. Each anode terminal (A) is connected to one or X multiple conductor and each cathode terminal (K) is connected to the other or Y conductor multiple for each crosspoint. The anode gate (AG) is connected to the output of an inverting AND gate 70 with two inputs, the gate 70 being individual to the respective crosspoint.

The fourth terminal (which would not be present on a three-terminal SCR), the cathode gate terminal (KG) is connected to one end of a bias resistor 64 with the other end of resistor 64 connected to the cathode terminal (K) and the Y multiple.

Each multiple conductor for both the X and Y axis has an enabling path parallel to the main multiple conductor, the enabling paths serving as the two inputs to the crosspoint AND gates 70. For the X multiples, a common bias source $+V_R$ supplies all X conductor multiples through their respective threshold detectors 80. A particular one of these detectors individual to a conductor of a multiple will pass current when voltage above the threshold level is impressed across the respective X conductor. The output of the threshold detectors 80 feeds the current to the C input of the AND gates 70 while the marking voltage commonly biases the anode of the SCR at the crosspoints common to the particular conductor.

The threshold detectors 82 for the Y multiples are normally biased from a source of negative voltage $-V_R$. The detectors are designed to pass current when a negative bias voltage ($-V_K$) lower than $-V_R$ is impressed on a particular Y conductor, the voltage $V_K$ acting to bias the cathode of the crosspoints. This voltage $V_K$ appears at respective ones of the top terminals (FIG. 2) indicated as Y1, Y2 or Y3, concurrently with an enable signal on the respective control conductor C1-C3 as a result of the scan and allot of scanner 14 of FIG. 2. The output of the threshold detectors 82 feeds one input F of a two-input AND gate 90 common to each Y multiple conductor. The G input to each AND gate 90 receives enabling signals on its respective input leads C1-C3 responsive to a signal from the scanner or allotter of the respective stages. These enabling signals sequentially provide a signal on the G input of respective AND gates 90 so that AND gates 90 will transmit inverted signals through respective inverter 96 to thereby sequentially signal the D leads of the AND gates 70 on the Y conductors in sequence.

In this way, the necessary conditions met are as follows:

1. $+V_A \geq +V_R$ for the marked horizontal conductor

2. $V_K \leq -V_R$ for a marked vertical conductor and a control signal is received on the anode A gate terminal of the crosspoint at the intersection of the marked X and Y conductors.

Repeating this principle, to operate this crosspoint, a signal or mark on an X conductor multiple of magnitude greater than $+V_R$ must be received. Typical values of $+V_R$ for the matrix shown could range from at least 8½ volts and up to 16 or more volts, depending on the particular stage in the network involved, while the value of $V_A$ may be as high as +18 volts. Signals of above the minimum value on the X conductor multiple pass through the threshold detector 80 and provide a mark on the C input of AND gate 70 of the marked multiple.

A mark signal at input terminal 94 should be more negative than the negative reference voltage level of minus 12 volts, and may be any suitable voltage more negative than −12 volts and ranging to −18 volts. This signal to the D input of the AND gate 70 will cause the third condition to be met in that the $V_A > +V_R$; $-V_R > V_K$ and the gate signal is present. The crosspoint will then fire.

These matrix mark voltages may be maintained for a predetermined period sufficient to allow a path to fire through the network. Since they are the result of a scan or allot, they may recur in time at different crosspoints to enable a second attempt for a completed path, if none can be completed during the first attempt.

In the form of network configuration, the crosspoint units may be used in different ways. For example, in the primary stage the X conductors of the matrix of FIG. 2 may be connected to respective H multiple conductors while the Y conductors of the matrix may be connected to the V multiple conductors. To provide a matrix which responds to two conditions, one alternative is to keep the voltage on the Y conductors below or equal to $-V_R$ permanently. Thus, by impressing a mark on an X conductor above $+V_R$ and impressing a gate mark from scanner 14, I can fire a suitable crosspoint in the primary having access to the marked PH conductor.

For the secondary stage, I can connect the SH conductors to the Y conductors of the matrix and the X conductors of the matrix to the SV conductors. By providing the SH conductors with a bias voltage at or below $-V_R$, I can use a mark received from the prior stage on the SV conductors coupled with a scan mark signal from scanner 14 on the gate conductors to fire an idle secondary stage crosspoint.

In the quaternary stage, I can connect QH conductors to the junctors, the QH conductors being connected to the Y conductors of the matrix. For this stage, I may permanently enable the gate conductors and allow X and Y voltages of the proper magnitudes to fire a crosspoint in that matrix. One voltage (more negative than $-V_R$) is derived from the junctor mark signal on the QH multiple and the other a positive voltage mark greater than $+V_R$ from a tertiary stage crosspoint.

In the tertiary stage, I connect my Y conductors from the matrix to the TV conductors, the TV conductors being connected to the QV conductors. For this stage, I can set the voltage on the Y conductors of matrix to a value below $-V_R$ and use a positive mark from the secondary stage on the X conductors along with a suitable gating signal derived by control 16.

Figure 3:
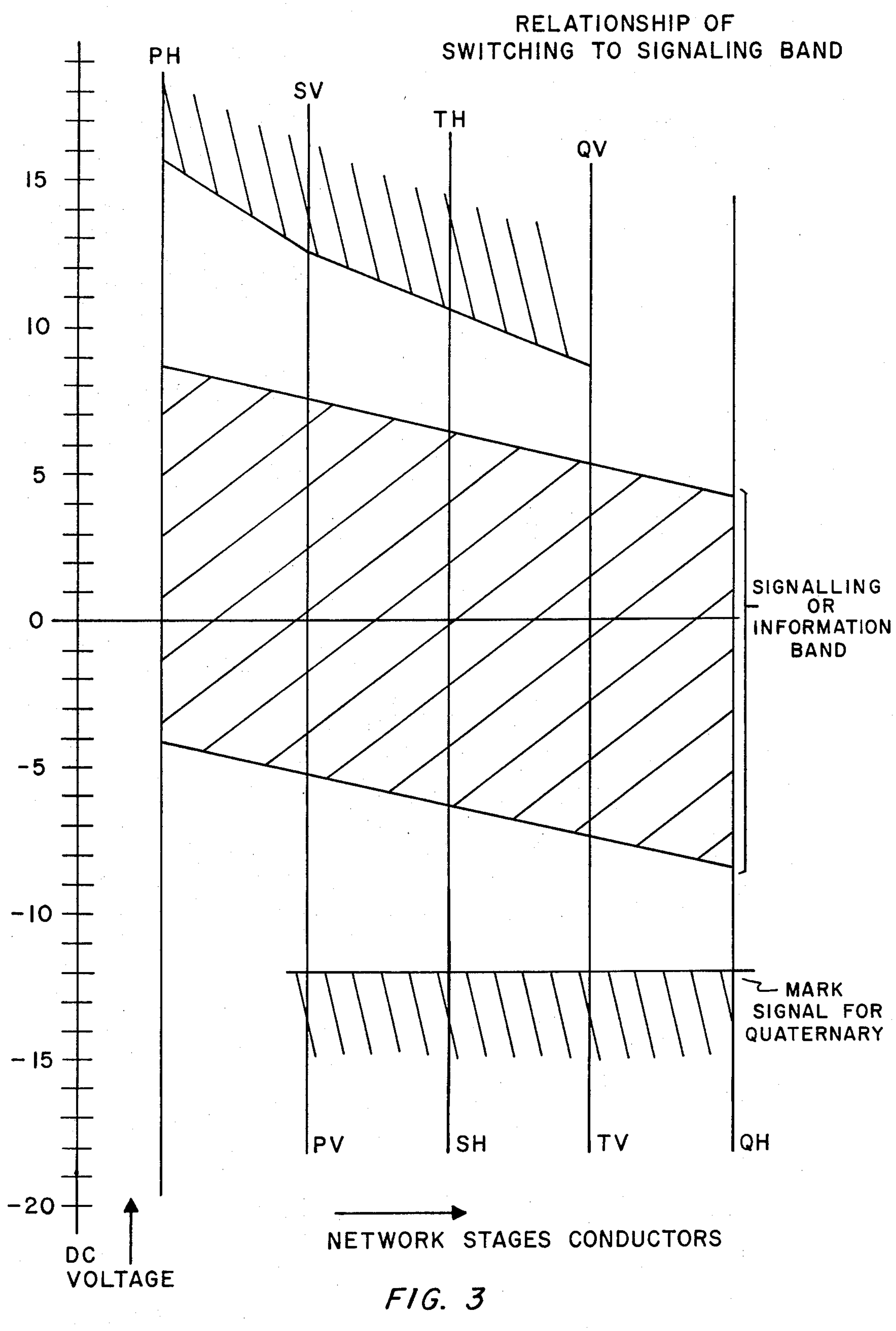
FIG. 3 is a graphical representation of the relationship between the voltage bands used for matrix switching and the voltages employed in signalling across a multiple stage crosspoint network of the type shown in FIG. 1.

The above multiple stage operation may be seen in the chart of FIG. 3 and shows one method whereby a single matrix design can be employed in a number of different combinations to effect firing. Of the three requirements for firing a crosspoint, I can permanently set any one requirement and allow the other two to cause firing of a crosspoint in the matrix.

A suitable auxiliary holding network 26 is connected in common to the PV conductors of the primary stage to hold any switched crosspoints at a proper but lower potential level, pending completion of a path through the network. Once a primary stage crosspoint has fired the hold network 26 maintains the current relationship necessary to hold a switched primary crosspoint in the triggered condition.

In FIG. 3, I show the voltage levels below $-V_R$ to be comparatively stable at about −12 volts for the PV, SH, TV and QH conductors. The $+V_R$ band varies from a maximum of +16V at the primary H conductor to approximately +9V, at the V conductor between the tertiary and quaternary stages. The signalling indicated by the central shaded band of FIG. 3 takes place at considerably lower voltages so that there is no interference between switching and signalling. Further, once a crosspoint has fired, the voltage applied across it is in the intermediate band such that the operating conditions cannot be met, thus eliminating the possibility of noise across a fired crosspoint. During the scan process, the voltage changes applied to a crosspoint are masked from the PH conductors and cannot emit noise while a path is being completed.

An established matrix path is released by starving the crosspoints of any current. This starving condition occurs in response to both the calling party hanging up his phone, changing the voltage level at the primary side of the network to ground while a like condition is occurring at the other end of the network, i.e., ground voltage level, these conditions reducing Is below the level of Ih.

In FIGS. 3 and 4, I show the immunity of a seized crosspoint with its applied voltage in the signalling band to firing signals being forwarded to adjacent crosspoints.

In FIG. 4, I show a portion of the matrix indicated as a seized path and adjacent crosspoints of interest. (For simplicity, the adjacent crosspoints in the secondary stage only are discussed as designated A2 and A1 corresponding to two possible conditions relative to the seized path referring to the "ON" or seized condition of the crosspoints indicated by the term seized.)

Condition 1: Ability of Matrix to Withstand "Break-in" into a Busy Path

In response to a request for service by line circuit LC2, the line circuit LC2 may extend a positive signal to the crosspoint labeled A2. The positive signal will eventually satisfy the inequality (1) (page 4 herein) as explained previously to provide a positive voltage greater than $+V_R$ on the PH conductor. During the scan cycle, a scanning signal will reach the A2 crosspoint yet the crosspoint A2 will not be triggered to conduction because its cathode is connected to the SH node of the seized pair which is held within the signalling band and condition (2) voltage more negative than $-V_R$ on the cathode cannot be met preventing the crosspoint A2 from breaking in the seized path.

Condition 2: Ability of a Seized Path to Prevent Firing into an Idle Nodal Point In response to a QH2 mark, the crosspoint A1 will be scanned to provide the gating signal. The SH nodal point to which the A1 crosspoint is connected is permanently biased to −18V, therefore satisfying inequality (2) of the switching requirements (page 4 herein). Yet the crosspoint is not switched on, the reason being the SV nodal point of the seized path band is within the signalling band voltages, thus violating inequality (1) (page 4 herein) of the switching requirement.

In this way, there is provided an electronic crosspoint matrix which requires three conditions to be met in order to fire the crosspoint.

I claim:

1. A switching matrix including a plurality of crosspoints, said matrix adapted to transmit information across a switched crosspoint of the matrix, said matrix comprising: a solid state thyristor at each crosspoint, each said thyristor having two signal terminals for the passage of information across a switched crosspoint, and a gate terminal, means for biasing one of said two signal terminals of one crosspoint with a first voltage when a mark voltage exceeding a first predetermined reference voltage is applied to said one terminal, means for biasing the other of said two signal terminals of said one crosspoint with a second voltage when a second mark voltage below a second predetermined reference voltage is applied to said other terminal, gate signal generating means, and means responsive to the presence of both marking voltages and a signal from said gate signal generating means for applying a gate signal to the gate terminal of said one crosspoint to switch the thyristor at said one crosspoint.

2. A switching matrix as claimed in claim 1, wherein said applying means detect the marking voltages and emit said gate signal only when said marking voltages exhibit the stated relationships with said reference voltages, and said gate signal generating means at each crosspoint is responsive to signals received from both said biasing means for emitting said gated signal to the gate terminal.

3. A switching matrix as claimed in claim 1, wherein said gate signal generating means comprises a two input AND gate having one input from each of the thyristor terminal bias-ing means.

4. A switching matrix as claimed in claim 1, wherein a hold voltage is applied to said signal terminals when a path including the switch thyristor is completed, said hold voltage preventing said switched thyristor from receiving further marking voltages.

5. A switching network comprising a matrix having a plurality of intersecting conductors, a solid state thyristor connected across each intersection, each said thyristor having two signal terminals connected to the respective intersecting conductors and a gate terminal, an AND gate for each intersection, the output of each said gate coupled to the gate terminal of the thyristor at the respective intersection, means for marking a first conductor with a first mark signal voltage to thereby bias said first conductor, means responsive to said first signal voltage being greater than a positive direct current reference voltage for enabling one input of the AND gates connected to crosspoints of the marked first conductor, means for marking a second conductor intersecting said first conductor with second mark signal voltage to thereby provide bias to said second intersecting conductor, means responsive to said second mark signal being more negative than a negative direct current reference voltage for providing bias to said second intersecting conductor thereby to enable a second input of the AND gate, said AND gate responsive to enabling of the two inputs to emit a signal to the gate terminal of the thyristor of the intersection of the two marked conductors to fire said thyristor.

6. A switching network as claimed in claim 5, wherein said enabling means comprises a threshold detector for emitting a gating signal responsive to said first mark signal voltage, and wherein said second conductor marking means comprises a threshold detector connected to the conductor for emitting a gating signal in response to an enabling second mark voltage applied thereto.

7. A switching network as claimed in claim 5, wherein each thyristor has a second gate terminal and a resistance connected between said second gate terminal and a conductor of the crosspoint to control the holding current for the respective thyristor.

8. A switching network comprising an orthogonal matrix having a first and a second intersecting conductor multiple, a semi-conductive controlled rectifier connected across each intersection of said multiples, each said rectifier having two signal terminals and a gate terminal, said two signal terminals of a rectifier each being connected to intersecting conductors, a two input AND gate at each crosspoint intersection with the output of said gate coupled to the gate terminal of the rectifier at the respective intersection, first means responsive to the marking of a conductor of said first multiple with a first mark signal voltage having a predetermined relation to a first reference voltage for thereby biasing said conductor and enabling one input of the AND gate connected to the marked conductor and second means responsive to marking a conductor of said second multiple with a second mark signal voltage having a predetermined relation to a second reference voltage to thereby bias said conductor of said second multiple, means responsive to a signal applied to said conductor of said second multiple and said second mark signal for enabling the second input of the AND gate at the intersection of said conductors of said first and second multiple to enable the second input of the AND gate connected to a crosspoint of the marked conductor and cause a gated signal to be emitted from said AND gate to the gate terminal of the rectifier of the intersection of the two marked conductors to fire the rectifier at the intersection of the marked conductors.

9. A network as claimed in claim 8, wherein said first mark responsive means comprises a threshold detector for emitting an output mark signal responsive to said first mark signal voltage.

10. A switching matrix including a plurality of conductors intersecting at crosspoints, said matrix comprising: a solid state thyristor at each crosspoint, each said thyristor having two terminals for the passage of information across a switched crosspoint, and a gate terminal, means preventing the switching of a thyristor until three coincident conditions are met including (a) means for biasing one of said two signal terminals of one crosspoint with a first marking voltage exceeding a first predetermined reference voltage to satisfy a first of said conditions, (b) means for biasing the other of said two signal terminals of said one crosspoint with a second marking voltage below a second predetermined reference voltage to provide a second of said conditions, and (c) scan means for enabling at least one crosspoint at a time to provide a third of said conditions, the thyristor at one crosspoint being responsive to the coincident presence of both marking voltages on said one crosspoint and the enabling of the one crosspoint for switching the one crosspoint to the ON condition.

* * * * *

UNITED STATES PATENT OFFICE

CERTIFICATE OF CORRECTION

Patent No. 3,801,749 Dated April 2, 1974

Inventor(s) Nikola Ljotic Jovic

It is certified that error appears in the above-identified patent and that said Letters Patent are hereby corrected as shown below:

On the cover sheet insert

-- [73] Assignee: International Telephone and Telegraph Corporation, New York, N. Y. --.

Signed and sealed this 24th day of September 1974.

(SEAL)
Attest:

McCOY M. GIBSON JR.
Attesting Officer

C. MARSHALL DANN
Commissioner of Patents